United States Patent
Kano et al.

(10) Patent No.: US 8,151,015 B2
(45) Date of Patent: Apr. 3, 2012

(54) SYSTEMS AND METHODS FOR EFFECTING DMA DATA TRANSFERS

(75) Inventors: Tsuyoshi Kano, Tokyo (JP); Mitsuki Hinosugi, Tokyo (JP); Masato Kajimoto, Chiba (JP); Yoichi Mizutani, Saitama (JP)

(73) Assignee: Sony Corporation, Tokyo (JP)

( * ) Notice: Subject to any disclaimer, the term of this patent is extended or adjusted under 35 U.S.C. 154(b) by 166 days.

(21) Appl. No.: 12/218,179

(22) Filed: Jul. 10, 2008

(65) Prior Publication Data

US 2009/0049225 A1 Feb. 19, 2009

(30) Foreign Application Priority Data

Aug. 15, 2007 (JP) ................ P2007-211860

(51) Int. Cl.
*G06F 13/28* (2006.01)
(52) U.S. Cl. .......... 710/22; 710/4; 710/55; 710/8; 710/20; 710/23; 710/33; 710/52
(58) Field of Classification Search .......... 710/4, 5, 710/8, 20, 22, 23, 33, 52
See application file for complete search history.

(56) References Cited

U.S. PATENT DOCUMENTS

| | | | | |
|---|---|---|---|---|
| 4,956,771 | A * | 9/1990 | Neustaedter | 710/52 |
| 5,797,037 | A * | 8/1998 | Ecclesine | 710/48 |
| 5,943,505 | A * | 8/1999 | Lumpkin et al. | 710/31 |
| 7,111,092 | B1 * | 9/2006 | Mitten et al. | 710/52 |
| 7,216,186 | B2 * | 5/2007 | Richardson | 710/53 |
| 2006/0173970 | A1 * | 8/2006 | Pope et al. | 709/216 |
| 2007/0239966 | A1 * | 10/2007 | Georgiou et al. | 712/28 |
| 2011/0110380 | A1 * | 5/2011 | Muller et al. | 370/412 |

FOREIGN PATENT DOCUMENTS

| | | |
|---|---|---|
| JP | 63-293657 | 11/1988 |
| JP | 04-177445 | 6/1992 |
| JP | 2002-140286 | 5/2002 |
| JP | 2004-118419 | 4/2004 |
| JP | 2005-182505 | 7/2005 |
| JP | 2001-331440 | 11/2011 |

* cited by examiner

*Primary Examiner* — Tariq Hafiz
*Assistant Examiner* — Jasjit Vidwan
(74) *Attorney, Agent, or Firm* — Robert J. Depke; Rockey, Depke & Lyons, LLC

(57) ABSTRACT

Disclosed herein is an information processing apparatus that transfers information, using direct memory access (DMA), between a first storage section in an information processing system and a second storage section in an information transfer system. The information processing system includes the first storage section for storing the information, and a control section. The information transfer system includes: the second storage section for storing descriptor information indicating the location at which the information is stored in the first storage section and the size of the information; and a DMA transfer section for DMA transferring the information between the first storage section and the second storage section based on the descriptor information. The DMA transfer section DMA transfers the descriptor information concerning the DMA transferred information from the second storage section to the first storage section. The control section loads the descriptor information from the first storage section.

15 Claims, 13 Drawing Sheets

SYSTEMS AND METHODS FOR EFFECTING DMA DATA TRANSFERS

CROSS REFERENCES TO RELATED APPLICATIONS

The present invention contains subject matter related to Japanese Patent Application JP 2007-211860, filed in the Japan Patent Office on Aug. 15, 2007, the entire contents of which being incorporated herein by reference.

BACKGROUND OF THE INVENTION

1. Field of the Invention

The present invention relates to an information processing apparatus and an information processing method for direct memory access (DMA) transferring information between a storage section in an information transfer system, such as a network card, and a storage section in an information processing system having a microprocessor (CPU), a program for executing the information processing method, a storage medium storing the program, a DMA controller, a DMA transfer method, a program for executing the DMA transfer method, and a storage medium storing the program. Specifically, descriptor information concerning the DMA transferred information is DMA transferred from a second storage section in the information transfer system to a first storage section in the information processing system, and the DMA transferred descriptor information is loaded from the first storage section. Thus, the descriptor information can be loaded without the need to access the second storage section in the information transfer system, which would require a long processing time, and a processing speed of the apparatus can be increased.

2. Description of the Related Art

In recent years, DMA transfer has been widely employed in order to allow information to be transferred between the storage section in the information processing system and the storage section in the information transfer system at a high speed. For example, a descriptor is stored beforehand in a register of a DMA controller in the information transfer system, e.g., the network card, and the CPU writes, to the register of the DMA controller, an address of a destination (or a source) and an amount of data to be transferred. Thereafter, the CPU issues a start command to the DMA controller, thereby initiating a DMA transfer. When the transfer of that amount of data, which has been written to the register, is complete, this transfer operation is completed. Thus, operation information such as the destination address and so on needs to be written to the register each time a transfer operation is performed, and this burdens the CPU.

By way of addressing this problem, the CPU may generate, on a random access memory (RAM), a descriptor (a DMA transfer information queue) indicating the destination address and so on, and instruct the DMA controller to start the DMA transfer. Upon receipt of the instruction to start the DMA transfer from the CPU, the DMA controller performs the DMA transfer while referring to the descriptor generated on the RAM. Thus, the CPU is capable of issuing an instruction to start data transfer asynchronously to the DMA transfer. This enables high-speed processing, in particular when a plurality of pieces of data are DMA transferred.

When the DMA transfer is complete, the DMA controller provides an interrupt to the CPU. Upon receipt of the interrupt, the CPU loads the descriptor from the register of the DMA controller. After loading the descriptor, the CPU performs a process of releasing a buffer and so on in the case where the DMA transfer completed is sequential transmission, and processes received data in the case where the DMA transfer is data reception.

In connection with the above related-art technique, Japanese Patent Laid-open No. 2002-140286 (page 6, FIGS. 3 and 5) discloses an information processing apparatus having a DMA transfer capability. In this information processing apparatus, a DMA controller 41 loads descriptor information 53 stored in an image memory 43 into a register prepared in the DMA controller 41. As a result, the DMA controller 41 is able to perform a DMA transfer process while referring to the loaded descriptor information 53.

SUMMARY OF THE INVENTION

Notice here that, in the case of the DMA controllers according to the related-art technique and Japanese Patent Laid-open 2002-140286, the CPU, upon receipt of the interrupt provided when the DMA transfer is complete, loads the descriptor by referring to the register of the DMA controller. This process of the CPU loading the descriptor from the register of the DMA controller, however, is slower than a process of the CPU accessing the RAM, for example. This is because the CPU needs to use a special command to access the register of the DMA controller, since a memory space in the register of the DMA controller is distinct from a memory space of the RAM, for example.

The present invention addresses the above-identified, and other problems associated with existing methods and apparatuses, and provides an information processing apparatus and an information processing method that enable high-speed processing while allowing the descriptor information to be loaded without the need to access the storage section in the information transfer system, which would require a long processing time, and also provides a program for executing the information processing method, a storage medium storing the program, a DMA controller, a DMA transfer method, a program for executing the DMA transfer method, and a storage medium storing the program.

According to one embodiment of the present invention, there is provided an information processing apparatus that transfers information, using DMA, between a first storage section in an information processing system and a second storage section in an information transfer system, the information processing system including the first storage section configured to store the information, and a control section configured to control the apparatus, the information transfer system including the second storage section configured to store descriptor information that indicates a location at which the information is stored in the first storage section and a size of the information, and a DMA transfer section configured to DMA transfer the information between the first storage section and the second storage section based on the descriptor information stored in the second storage section, wherein the DMA transfer section DMA transfers the descriptor information concerning the DMA transferred information from the second storage section to the first storage section, and the control section loads, from the first storage section, the descriptor information which has been DMA transferred by the DMA transfer section.

According to the above-described information processing apparatus, when the information is DMA transferred between the first storage section in the information processing system and the second storage section in the information transfer system, the descriptor information that indicates the location at which the information is stored in the first storage section and the size of the information is stored in the second storage section. Based on the descriptor information stored in the second storage section, the DMA transfer section DMA transfers the information between the first storage section and the second storage section. In this case, the DMA transfer section DMA transfers the descriptor information concerning the DMA transferred information from the second storage section to the first storage section. At this time, the control section loads, from the first storage section, the descriptor information which has been DMA transferred by the DMA transfer section. Thus, the control section is capable of loading the descriptor information without the need to access the second storage section in the information transfer system, which would require a long processing time.

According to another embodiment of the present invention, there is provided an information processing method of DMA transferring information between a first storage section in an information processing system and a second storage section in an information transfer system. The method includes the steps of: generating descriptor information that indicates a location at which the information is stored in the first storage section and a size of the information; storing the generated descriptor information in the second storage section in the information transfer system; DMA transferring the information between the first storage section and the second storage section based on the descriptor information stored in the second storage section; DMA transferring the descriptor information concerning the DMA transferred information from the second storage section to the first storage section; and loading the DMA transferred descriptor information from the first storage section.

According to the above-described information processing method, when the information is DMA transferred between the first storage section in the information processing system and the second storage section in the information transfer system, it is possible to load the descriptor information without the need to access the second storage section in the information transfer system, which would require a long processing time.

According to yet another embodiment of the present invention, there is provided a program for causing a computer to execute an information processing method to DMA transfer information between a first storage section in an information processing system and a second storage section in an information transfer system. The method includes the steps of: generating descriptor information that indicates a location at which the information is stored in the first storage section and a size of the information; storing the generated descriptor information in the second storage section in the information transfer system; DMA transferring the information between the first storage section and the second storage section based on the descriptor information stored in the second storage section; DMA transferring the descriptor information concerning the DMA transferred information from the second storage section to the first storage section; and loading the DMA transferred descriptor information from the first storage section.

According to yet another embodiment of the present invention, there is provided a computer-readable storage medium that has stored therein a program for causing a computer to execute an information processing method to DMA transfer information between a first storage section in an information processing system and a second storage section in an information transfer system. The method includes the steps of: generating descriptor information that indicates a location at which the information is stored in the first storage section and a size of the information; storing the generated descriptor information in the second storage section in the information transfer system; DMA transferring the information between the first storage section and the second storage section based on the descriptor information stored in the second storage section; DMA transferring the descriptor information concerning the DMA transferred information from the second storage section to the first storage section; and loading the DMA transferred descriptor information from the first storage section.

According to the above-described program and storage medium for the above-described information processing method, when the information is DMA transferred between the first storage section in the information processing system and the second storage section in the information transfer system, the program can be executed by the computer to load the descriptor information without the need to access the second storage section in the information transfer system, which would require a long processing time.

According to yet another embodiment of the present invention, there is provided a DMA controller for DMA transferring information between a first storage section in an information processing system and a second storage section in an information transfer system, the DMA controller including: the second storage section configured to store descriptor information that indicates a location at which the information is stored in the first storage section and a size of the information; and a DMA transfer section configured to DMA transfer the information between the first storage section and the second storage section based on the descriptor information stored in the second storage section, wherein the DMA transfer section DMA transfers the descriptor information concerning the DMA transferred information from the second storage section to the first storage section.

According to the above-described DMA controller, when the information is DMA transferred between the first storage section in the information processing system and the second storage section in the information transfer system, the descriptor information that indicates the location at which the information is stored in the first storage section and the size of the information is stored in the second storage section. Based on the descriptor information stored in the second storage section, the DMA transfer section DMA transfers the information between the first storage section and the second storage section. In this case, the DMA transfer section DMA transfers the descriptor information concerning the DMA transferred information from the second storage section to the first storage section. At this time, the descriptor information which has been DMA transferred by the DMA transfer section can be loaded from the first storage section, without the need to access the second storage section in the information transfer system, which would require a long processing time.

According to yet another embodiment of the present invention, there is provided a DMA transfer method of DMA transferring information between a first storage section in an information processing system and a second storage section in an information transfer system, the method including the steps of: generating descriptor information that indicates a location at which the information is stored in the first storage section and a size of the information; storing the generated descriptor information in the second storage section in the information transfer system; DMA transferring the information between the first storage section and the second storage section based on the descriptor information stored in the second storage section; and DMA transferring the descriptor information concerning the DMA transferred information from the second storage section to the first storage section.

According to the above-described DMA transfer method, when the information is DMA transferred between the first storage section in the information processing system and the second storage section in the information transfer system, it is possible to load the descriptor information without the need to access the second storage section in the information transfer system, which would require a long processing time.

According to yet another embodiment of the present invention, there is provided a program for causing a computer to execute a DMA transfer method to DMA transfer information between a first storage section in an information processing system and a second storage section in an information transfer system. The method includes the steps of: generating descriptor information that indicates a location at which the information is stored in the first storage section and a size of the information; storing the generated descriptor information in the second storage section in the information transfer system; DMA transferring the information between the first storage section and the second storage section based on the descriptor information stored in the second storage section; and DMA transferring the descriptor information concerning the DMA transferred information from the second storage section to the first storage section.

According to yet another embodiment of the present invention, there is provided a computer-readable storage medium that has stored therein a program for causing a computer to execute a DMA transfer method to DMA transfer information between a first storage section in an information processing system and a second storage section in an information transfer system. The method includes the steps of: generating descriptor information that indicates a location at which the information is stored in the first storage section and a size of the information; storing the generated descriptor information in the second storage section in the information transfer system; DMA transferring the information between the first storage section and the second storage section based on the descriptor information stored in the second storage section; and DMA transferring the descriptor information concerning the DMA transferred information from the second storage section to the first storage section.

According to the above-described program and storage medium for the above-described DMA transfer method, when the information is DMA transferred between the first storage section in the information processing system and the second storage section in the information transfer system, the program can be executed by the computer to load the descriptor information without the need to access the second storage section in the information transfer system, which would require a long processing time.

According to the information processing apparatus, the information processing method, the program and the storage medium for the information processing method according to the above-described embodiments of the present invention, when the information is DMA transferred between the first storage section in the information processing system and the second storage section in the information transfer system, the descriptor information concerning the DMA transferred information is DMA transferred from the second storage section to the first storage section, and the control section loads the DMA transferred descriptor information from the first storage section.

Thus, the control section is capable of loading the descriptor information without the need to access the second storage section in the information transfer system, which would require a long processing time. This reduces a load on the control section, resulting in an increased processing speed of the apparatus.

According to the DMA controller, the DMA transfer method, the program and the storage medium for the DMA transfer method according to the above-described embodiments of the present invention, when the information is DMA transferred between the first storage section in the information processing system and the second storage section in the information transfer system, the descriptor information concerning the DMA transferred information is DMA transferred from the second storage section to the first storage section.

Thus, it is possible to load the descriptor information concerning the DMA transferred information from the first storage section in the information processing system, without the need to access the second storage section in the information transfer system, which would require a long processing time. This results in an increase in the processing speed.

DETAILED DESCRIPTION OF THE PREFERRED EMBODIMENTS

Hereinafter, an information processing apparatus, an information processing method, a program for executing the information processing method, a storage medium storing the program, a DMA controller, a DMA transfer method, a program for executing the DMA transfer method, and a storage medium storing the program according to embodiments of the present invention will be described with reference to the accompanying drawings.

First Embodiment

Figure 1:
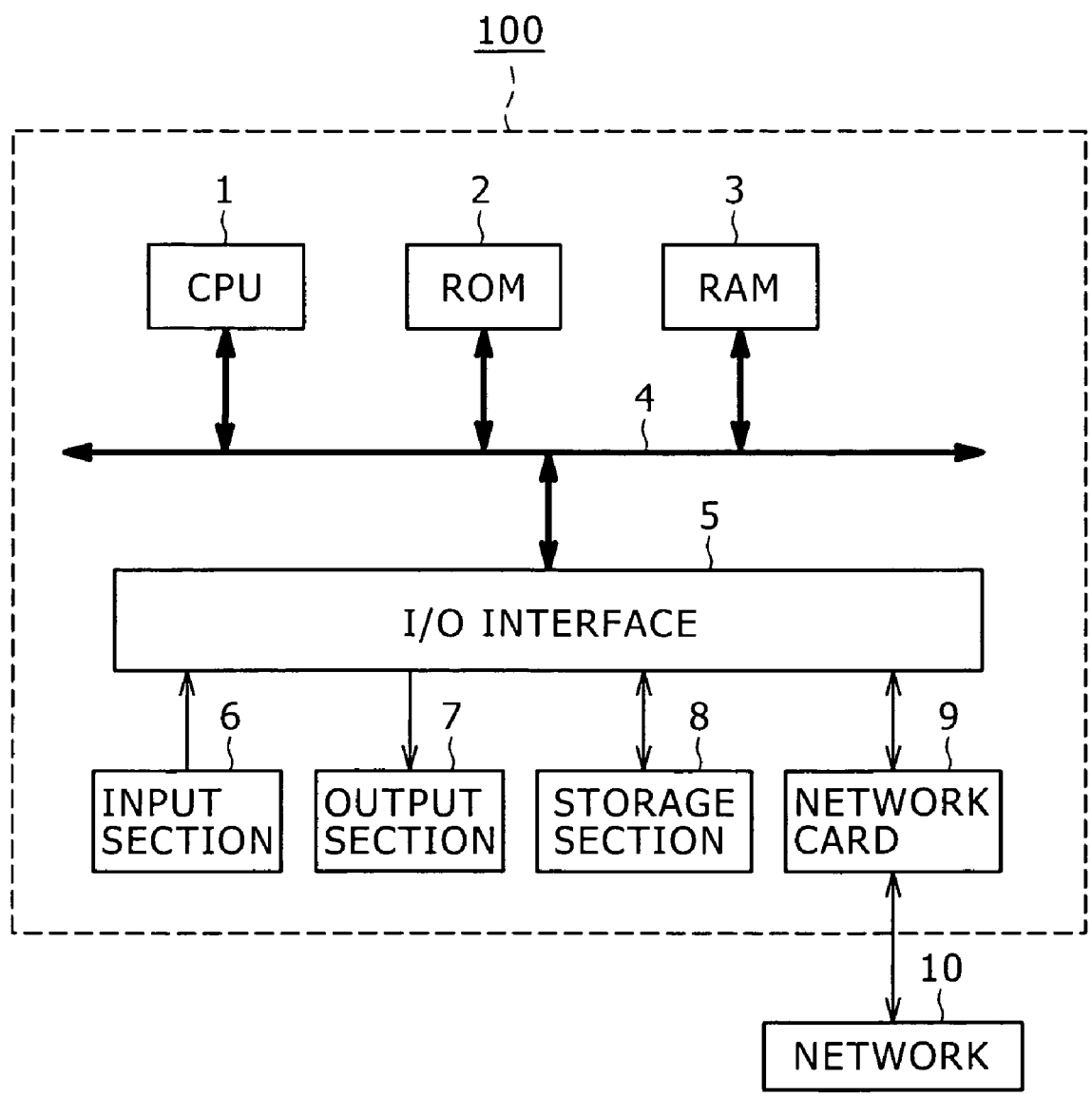
FIG. 1 is a block diagram illustrating an exemplary structure of a personal computer according to a first embodiment of the present invention.

FIG. 1 is a block diagram illustrating an exemplary structure of an information processing apparatus (hereinafter referred to as a personal computer (PC)) 100 according to a first embodiment of the present invention. As shown in FIG. 1, the PC 100 is connected to a network 10, and processes information that is inputted or outputted via a network card 9 having a capability for DMA transfer using a transmit descriptor. The PC 100 includes a CPU 1, a ROM 2, a RAM 3, a bus 4, an I/O interface 5, an input section 6, an output section 7, a storage section 8, and the network card 9.

The ROM (Read Only Memory) 2 is connected to the bus 4. A program and so on are stored in the ROM 2. The CPU 1 functions as an example of a control section, and is connected to the ROM 2 and the RAM 3 (an example of a first storage section) via the bus 4. The CPU 1 loads the program and so on stored in the ROM 2 into the RAM 3, and performs various processes in accordance with the program.

In addition, the CPU 1 is connected, via the I/O (Input/Output) interface 5 connected to the bus 4, to the input section 6 such as a keyboard and a mouse, the output section 7 such as a display or a printer, the storage section 8 such as a hard disk, and the network card 9, which performs the DMA transfer.

The input section 6 outputs, to the CPU 1, character information or the like entered by a user. The CPU 1 stores the character information or the like outputted from the input section 6 in the storage section 8. A program and so on are stored in the storage section 8. The output section 7 outputs image information or the like outputted from the CPU 1.

The network card 9 is connected to the network 10. For example, the network card 9 converts data within the PC 100 into a format that allows the data to be transferred over the network 10.

A transmission rate at which the CPU 1 communicates with the ROM 2 or the RAM 3, which are connected directly to the bus 4, is generally higher than a transmission rate at which the CPU 1 communicates with the network card 9 or the like via the I/O interface 5. That is, a speed at which the CPU 1 loads data into the RAM 3 is much higher than a speed at which the CPU 1 loads data into a register 9a (see FIG. 2) of the network card 9, for example. This is because the CPU 1 needs to use a special command to access the register 9a, since a memory space in the register 9a of the network card 9 is distinct from a memory space in the RAM 3. Note that the network card 9 may be referred to as a local area network (LAN) card, a network adapter, a network interface card (NIC), or the like, for example.

Figure 2:
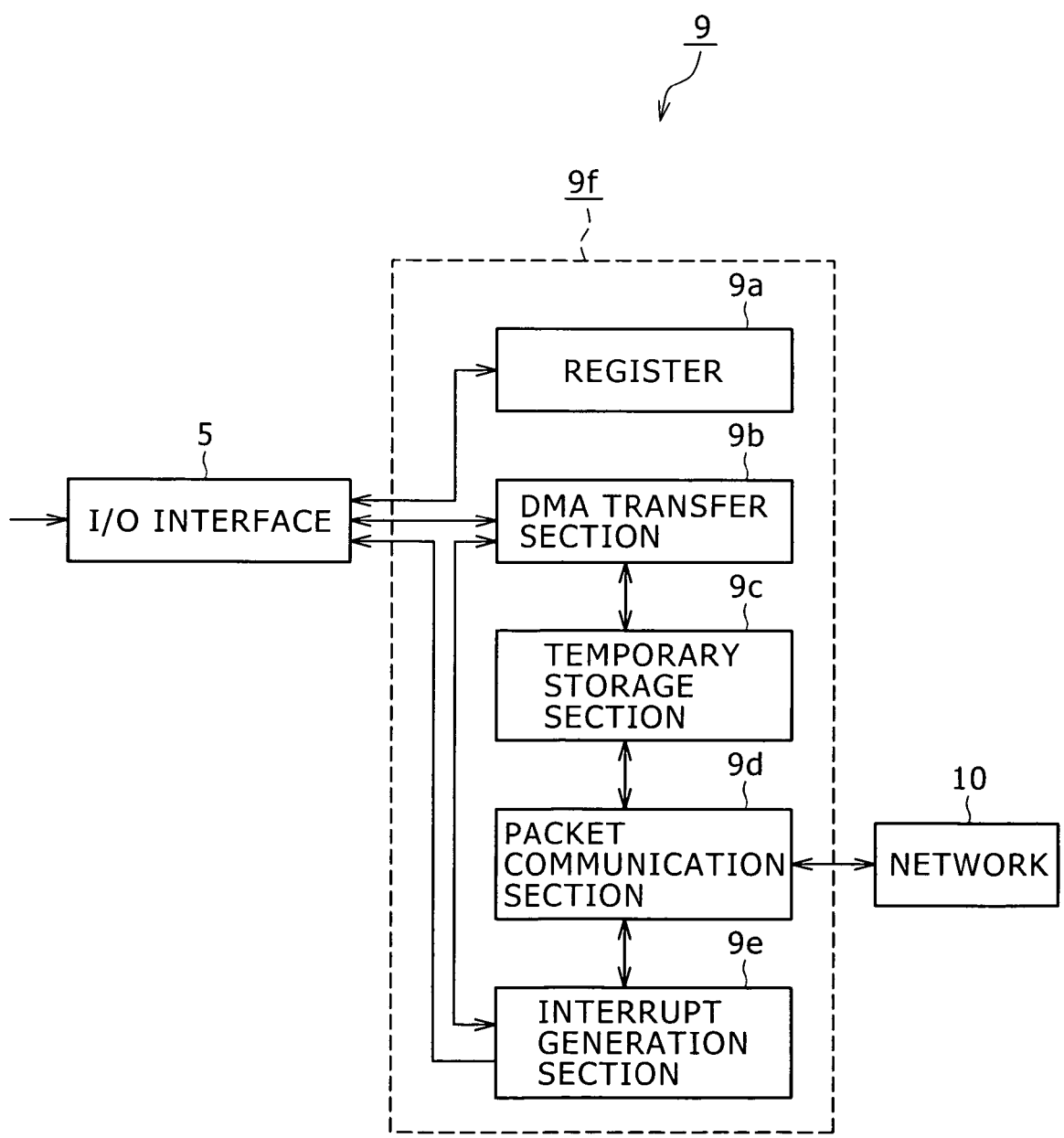
FIG. 2 is a block diagram illustrating an exemplary structure of a transmission section of a network card.

FIG. 2 is a block diagram illustrating an exemplary structure of a transmission section 9f of the network card 9. As shown in FIG. 2, the transmission section 9f includes the register 9a, a DMA transfer section 9b, a temporary storage section 9c, a packet communication section 9d, and an interrupt generation section 9e. The register 9a constitutes an example of a second storage section, and is connected to the CPU 1 via the I/O interface 5. A command sent from the CPU 1 to the transmission section 9f of the network card 9 is written to the register 9a. In addition, a state of the transmission section 9f is stored in the register 9a.

The DMA transfer section 9b is connected to the temporary storage section 9c (an example of the second storage section), and also connected to the RAM 3 (see FIG. 1) via the I/O interface 5.

The DMA transfer section 9b transfers, to the temporary storage section 9c, a transmit descriptor 21 (see FIG. 4) generated by the CPU 1 on the RAM 3, so that the transmit descriptor 21 is stored in the temporary storage section 9c. The transmit descriptor 21 indicates, at least, the size of a transmission packet (information) that is to be DMA transferred and a location at which the transmission packet is stored in the RAM 3.

Based on the transmit descriptor 21 stored in the temporary storage section 9c, the DMA transfer section 9b DMA transfers the transmission packet between the RAM 3 and the temporary storage section 9c. In this example, the DMA transfer section 9b reads the transmission packet from the RAM 3 directly, not via the CPU 1, and writes the transmission packet to the temporary storage section 9c. Thereafter, the DMA transfer section 9b DMA transfers the transmit descriptor 21 concerning the DMA transferred transmission packet from the temporary storage section 9c to the RAM 3. In this example, when the DMA transfer of the transmission packet is complete, the DMA transfer section 9b DMA transfers the transmit descriptor 21 indicating completion of the DMA transfer of the transmission packet from the temporary storage section 9c to the RAM 3. When loading the transmit descriptor 21 concerning the DMA transferred transmission packet, the CPU 1 refers to the RAM 3 to load the transmit descriptor 21 indicating the completion of the DMA transfer, for example.

As a result, the CPU 1 is able to recognize a transmission completion location without the need to access the register 9a, which would require a long processing time. This reduces a load on the CPU 1, thereby increasing a processing speed of the PC 100.

The temporary storage section 9c is connected to the packet communication section 9d. The temporary storage section 9c stores the transmit descriptor 21. In addition, the temporary storage section 9c temporarily stores the transmission packet to be transferred by the packet communication section 9d to the network 10 and the transferred transmission packet. The packet communication section 9d is connected to the network 10, and transfers the transmission packet stored in the temporary storage section 9c to the network 10.

The interrupt generation section 9e is connected to the DMA transfer section 9b, and is also connected to the CPU 1 via the I/O interface 5. The interrupt generation section 9e receives a notification of the completion of the DMA transfer and the like from the DMA transfer section 9b, and transmits a DMA transfer completion state to the CPU 1 to interrupt the CPU 1. Upon receipt of the DMA transfer completion state from the interrupt generation section 9e, the CPU 1 performs a process of releasing the buffer or the like. Note that the DMA transfer section 9b and the temporary storage section 9c constitute examples of the DMA controller and an information transfer system. Also note that the CPU 1 and the RAM 3 constitute an example of an information processing system.

Figure 3:
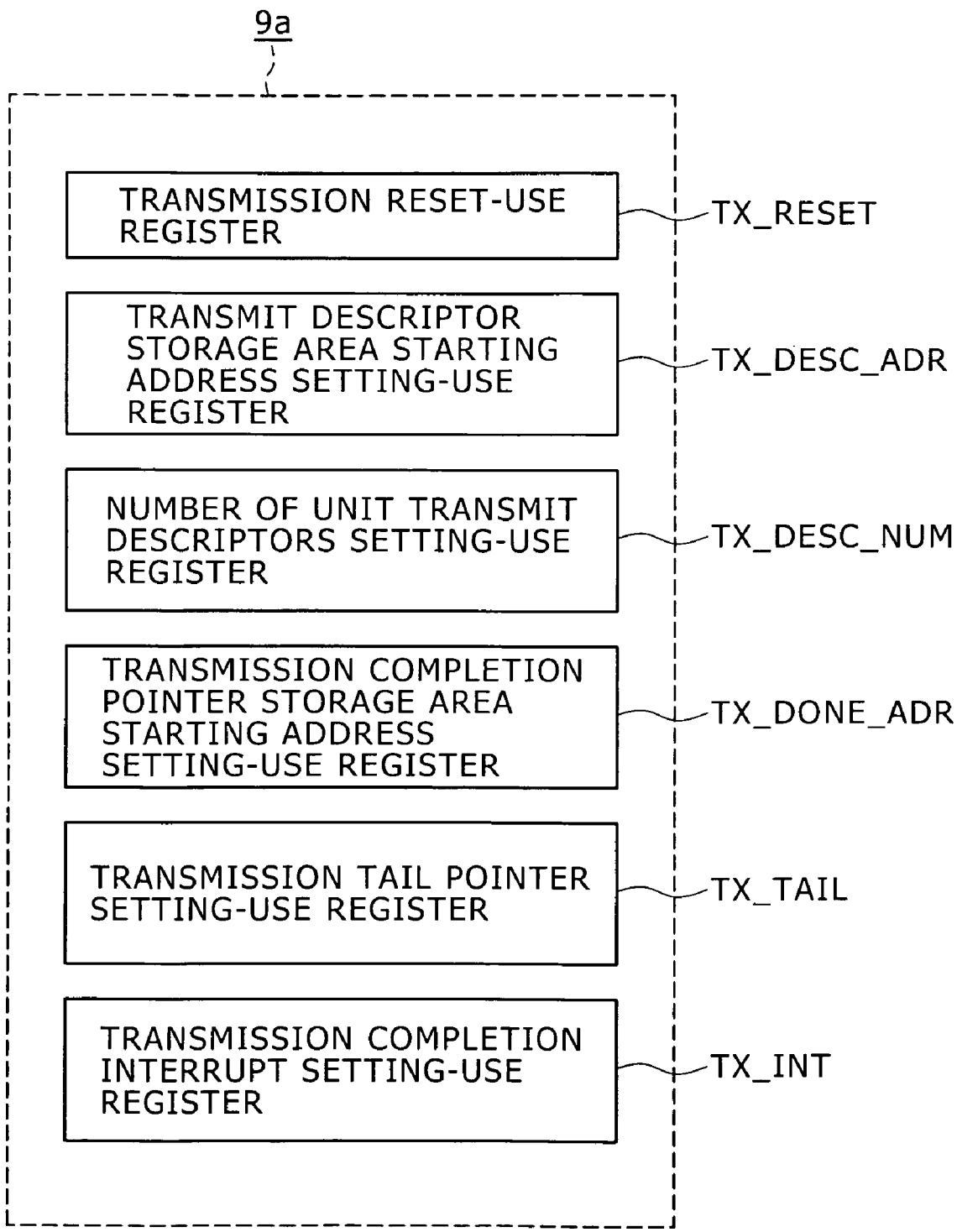
FIG. 3 is a diagram illustrating an exemplary structure of a register.

FIG. 3 is a diagram illustrating an exemplary structure of the register 9a. As shown in FIG. 3, the register 9a includes, at least, a "transmission reset-use register" TX_RESET, a "transmit descriptor storage area starting address setting-use register" TX_DESC_ADR, a "number of unit transmit descriptors setting-use register" TX_DESC_NUM, a "transmission completion pointer storage area starting address setting-use register" TX_DONE_ADR, a "transmission tail pointer setting-use register" TX_TAIL, and a "transmission completion interrupt setting-use register" TX_INT.

The "transmission reset-use register" TX_RESET is a register used to reset a transmission function. The "transmit descriptor storage area starting address setting-use register" TX_DESC_ADR is a register used for the CPU 1 to set a starting address of a location at which the transmit descriptor is stored in the RAM 3 and notify the network card 9 of that location.

The "number of unit transmit descriptors setting-use register" TX_DESC_NUM is a register used for the CPU 1 to set the number of elements of the transmit descriptor and notify the network card 9 of that number. The "transmission completion pointer storage area starting address setting-use register" TX_DONE_ADR is a register used to indicate a starting address of an area in the RAM 3 to which the network card 9 writes a transmission completion pointer. The "transmission tail pointer setting-use register" TX_TAIL is a register used for the CPU 1 to set a transmission tail pointer and instruct the network card 9 to start a transmission operation. The "transmission completion interrupt setting-use register" TX_INT is a register used for the network card 9 to notify the CPU 1 of the completion of the transmission with the interrupt. The register 9a has the above-described structure.

Figure 4:
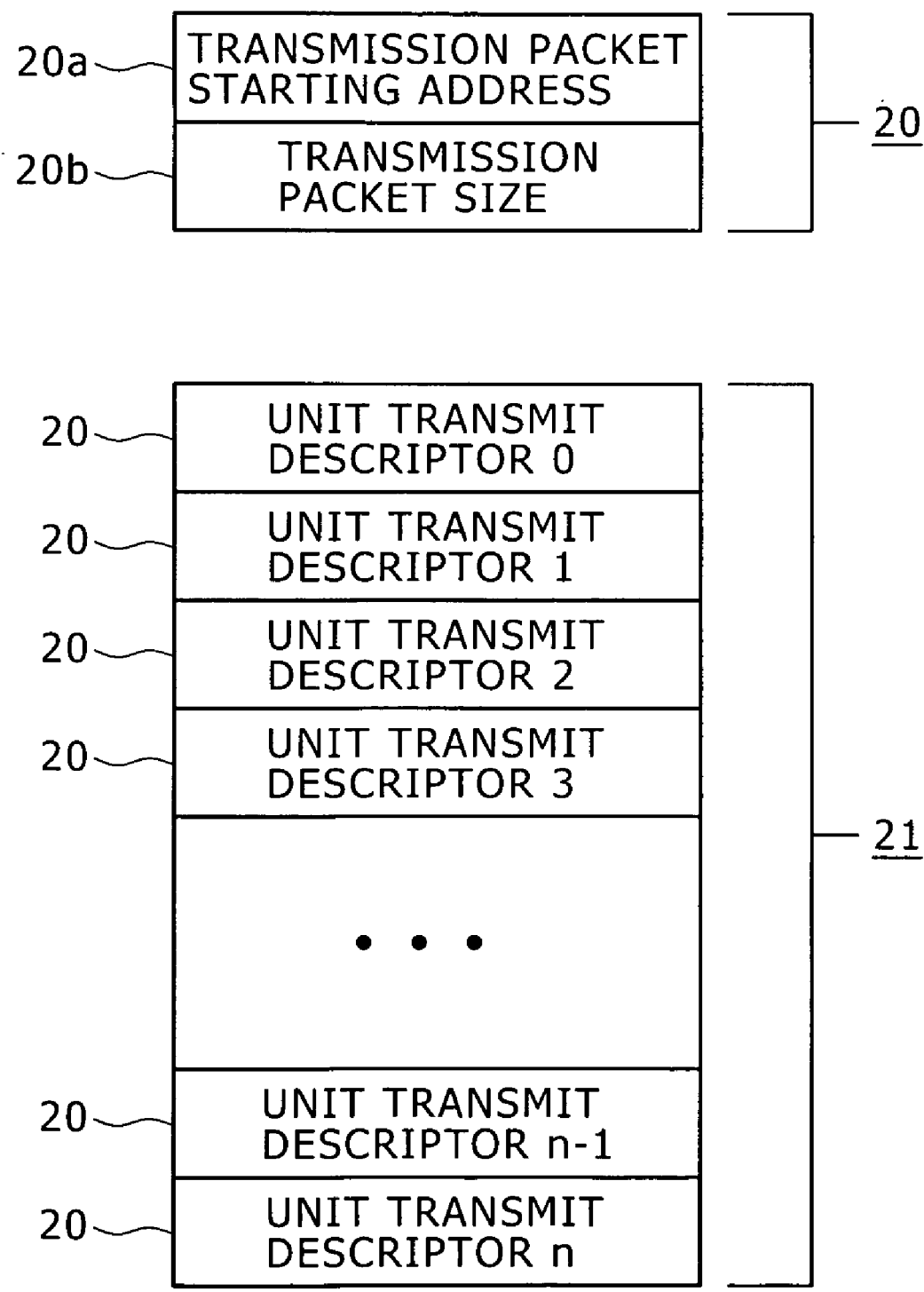
FIG. 4 is a diagram illustrating an exemplary structure of a transmit descriptor.

FIG. 4 is a diagram illustrating an exemplary structure of the transmit descriptor 21. As shown in FIG. 4, the transmit descriptor 21 is composed of n unit transmit descriptors 20 (n is the number of elements) each including, at least, a transmission packet starting address 20a and a transmission packet size 20b. The transmit descriptor 21 is generated by the CPU 1 at one place in the RAM 3 (see FIG. 1). The structure of the unit transmit descriptor 20 is known to both the network card 9 and the CPU 1.

If the CPU 1 specifies, for the DMA transfer section 9b in the network card 9, the starting address of the transmit descriptor 21 in the RAM 3 and an index i of a given unit transmit descriptor 20, the DMA transfer section 9b is able to identify a starting location of the given unit transmit descriptor 20. (The index i means that the corresponding unit transmit descriptor 20 is an (i+1)th unit transmit descriptor 20 from the top of the transmit descriptor 21.) That is because the DMA transfer section 9b recognizes the structure of the unit transmit descriptor 20, as noted previously. A value of the index will be hereinafter referred to as a descriptor number (0 to n).

Figure 5:
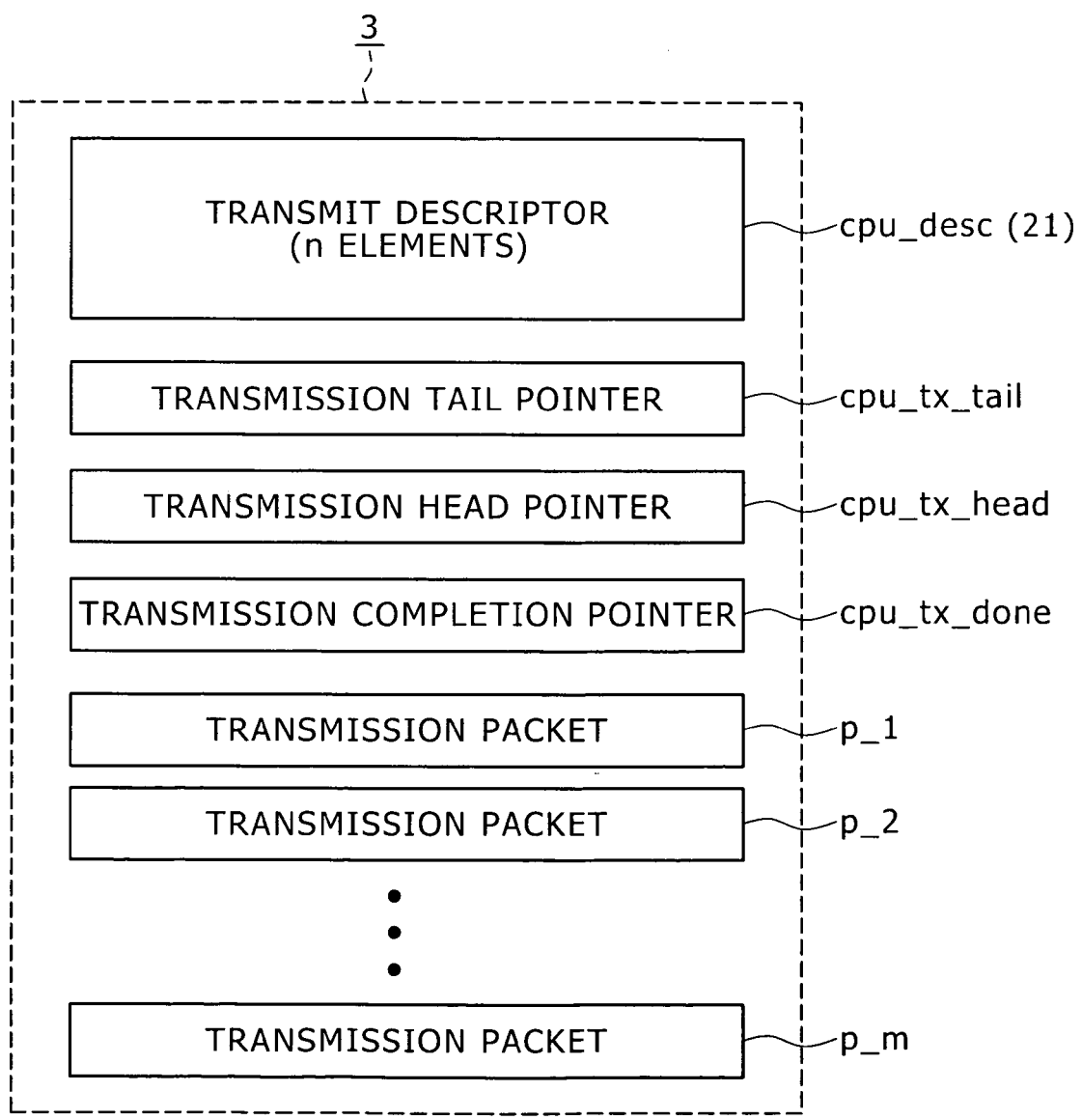
FIG. 5 is a diagram illustrating an exemplary structure of a memory area on a RAM.

Next, the structure of a memory area on the RAM 3 will now be described below. FIG. 5 is a diagram illustrating an exemplary structure of the memory area on the RAM 3. In this example, transmission packets p_1 to p_m on the RAM 3 as shown in FIG. 5 are transmitted sequentially, starting with the transmission packet p_1, to the network 10 via the network card 9 as shown in FIG. 1.

On the RAM 3 is secured an area for storing the transmit descriptor 21 having the n unit transmit descriptors 20 (see FIG. 4). Hereinafter, the transmit descriptor 21 on the RAM 3 will be referred to as a "transmit descriptor cpu_desc" or simply as "cpu_desc". In addition, an area for storing a transmission tail pointer cpu_tx_tail is secured on the RAM 3. The transmission tail pointer cpu_tx_tail indicates a descriptor number that is used when the CPU 1 transmits a next packet. In addition, an area for storing a transmission head pointer cpu_tx_head is secured on the RAM 3. The transmission head pointer cpu_tx_head indicates the first descriptor number to be subjected to a transmission completion process after the CPU 1 completes the transmission of the next packet. In addition, an area for storing a transmission completion pointer cpu_tx_done is secured on the RAM 3. The transmission completion pointer cpu_tx_done indicates a descriptor number used to transmit a packet that has just been transmitted by the network card 9. The above memory areas are secured on the RAM 3.

Note here that the term "transmission completion process" as used herein refers to releasing a packet buffer used for the transmission or notifying an application of the completion of the transmission, for example. In order to facilitate the understanding of the description, it is assumed here that the number of elements (i.e., the number of unit transmit descriptors 20), n, is equal to or greater than the number of transmission packets, m (i.e., n≧m). (In the case where the number of elements n<the number of transmission packets m, the transmission packets may be classified into n or less groups.) It is also assumed that the starting address of each variable, such as the transmit descriptor cpu_desc, is denoted as "@" followed by its reference characters, like "@cpu_desc".

Figure 6:
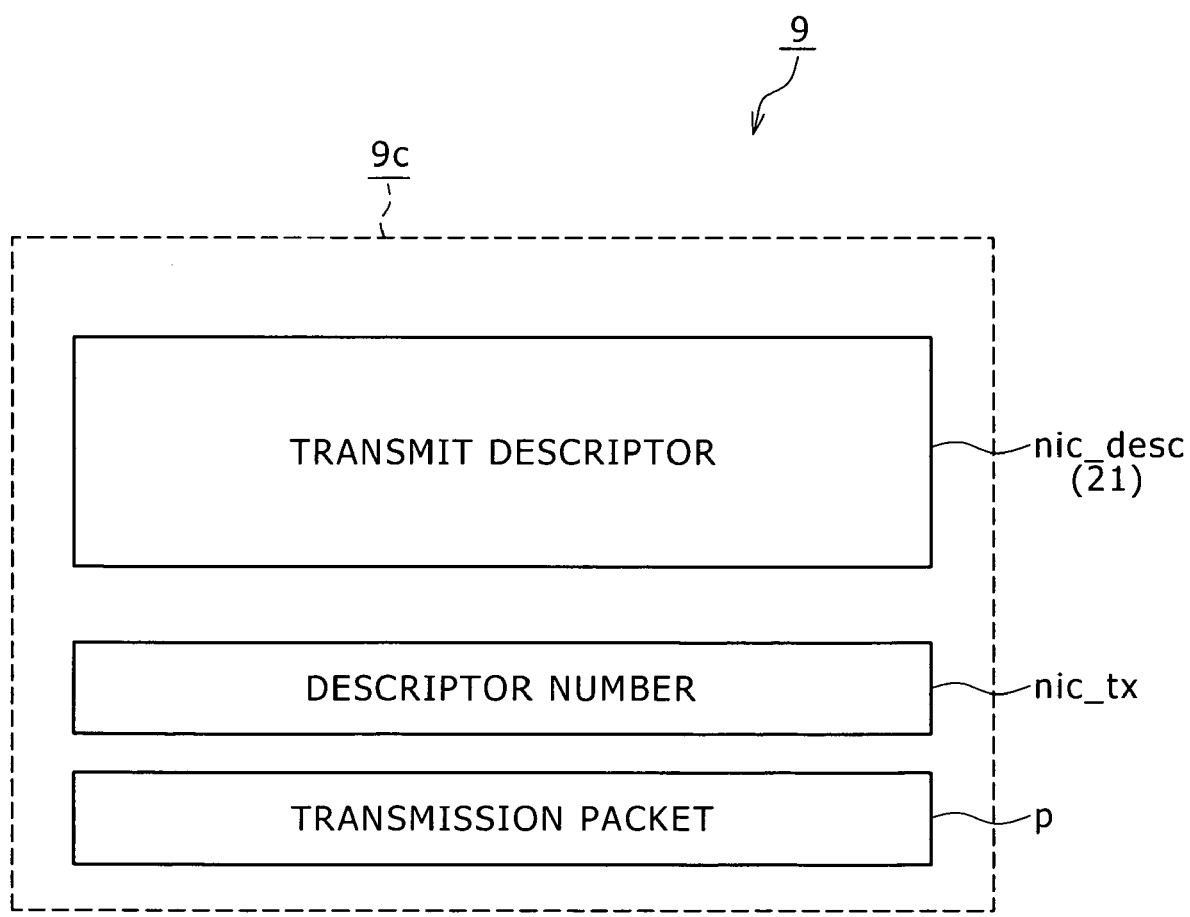
FIG. 6 is a diagram illustrating an exemplary structure of a memory area on a temporary storage section.

Next, the structure of a memory area on the temporary storage section 9c of the network card 9 as shown in FIG. 2 will now be described below. FIG. 6 is a diagram illustrating an exemplary structure of the memory area on the temporary storage section 9c. As shown in FIG. 6, the temporary storage section 9c includes an area for a transmit descriptor nic_desc, which stores a copy of the transmit descriptor 21 to be transmitted. The transmit descriptor 21 on the temporary storage section 9c will be hereinafter referred to as the "transmit descriptor nic_desc" or simply as "nic_desc". The temporary storage section 9c further includes an area for a descriptor number nic_tx, which indicates a descriptor number on the transmit descriptor nic_desc, which is to be transmitted by the network card 9 next. The temporary storage section 9c further includes an area p for storing the transmission packet to be transmitted. The memory area on the temporary storage section 9c has the above-described structure.

In order to facilitate the understanding of the description, it is assumed here that the area of nic_desc is equal to or larger than the area of the transmit descriptor cpu_desc on the RAM 3 (see FIG. 5), and that an image of each element of cpu_desc can be copied, as it is, to a corresponding element of nic_desc. That is, it is assumed here that cpu_desc as a whole can be copied, as it is, onto nic_desc, and that the descriptor numbers used on cpu_desc can be used, as they are, on nic_desc as well. Accordingly, it is assumed here that those elements of cpu_desc and nic_desc which correspond to descriptor number k are referred to as cpu_desc[k] and nic_desc[k], respectively, and that to copy cpu_desc[k] onto nic_desc means to "DMA copy" a content of cpu_desc[k] to nic_desc[k]. Note that in the case where the temporary storage section 9c is too small compared to the size of the transmit descriptor 21, the transmit descriptor 21 may be divided for the transfer.

Figure 7:
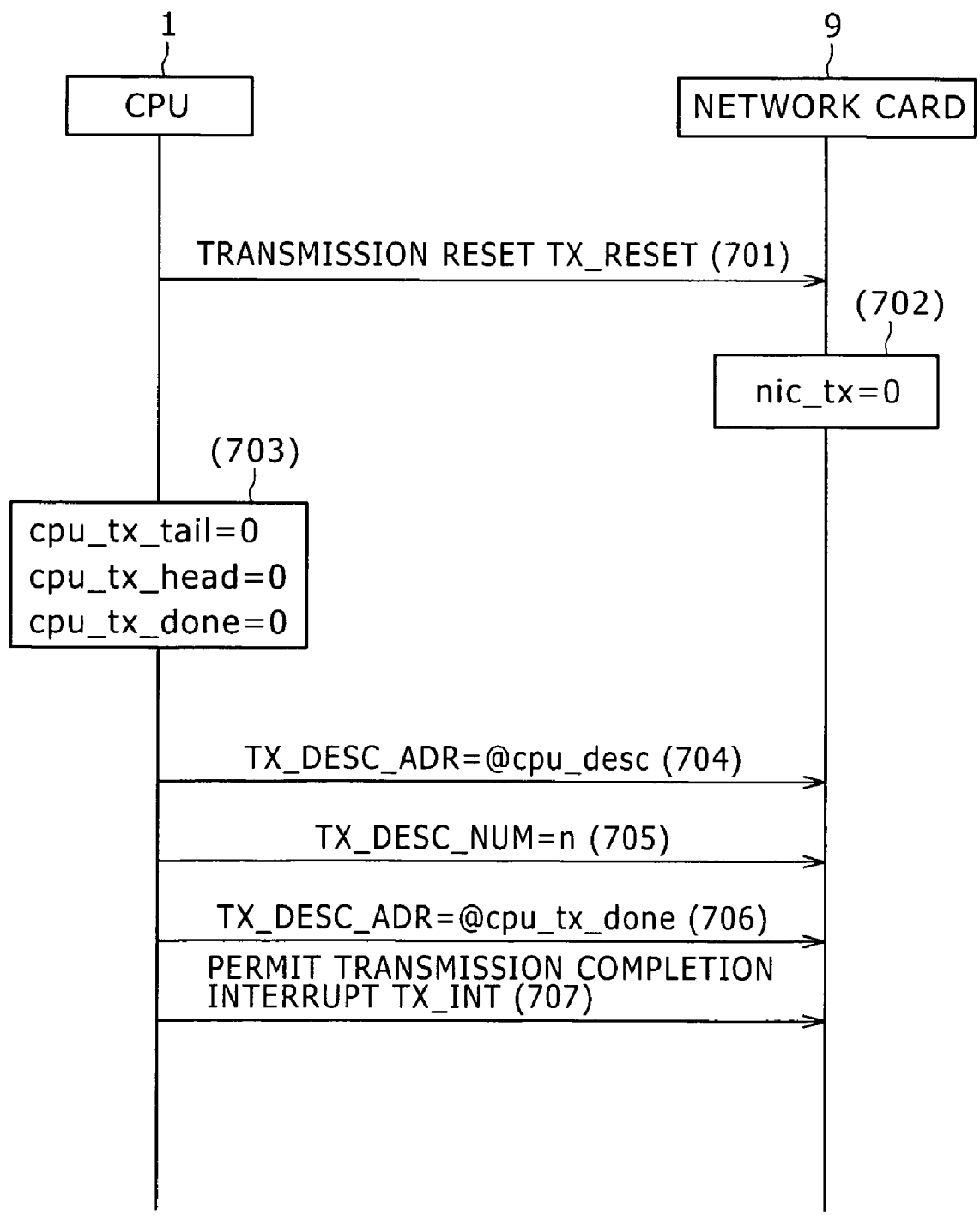
FIG. 7 is a sequence diagram illustrating an example of initialization of the network card.

Next, an example of the DMA transfer of the transmission packets will now be described below. FIG. 7 is a sequence diagram illustrating an example of initialization of the network card 9. As shown in FIG. 7, the CPU 1 resets a transmission process by using the transmission reset-use register TX_RESET in the register 9a of the network card 9 (701). As a result, the network card 9 initializes the descriptor number nic_tx in the temporary storage section 9c to "0" (702). For the initialization, the CPU 1 sets the transmission tail pointer cpu_tx_tail, the transmission head pointer cpu_tx_head, and the transmission completion pointer cpu_tx_done as shown in FIG. 5 to "0" (703). In addition, for the initialization, the CPU 1 sets, in the "transmit descriptor storage area starting address setting-use register" TX_DESC_ADR in the register 9a as shown in FIG. 3, a starting address @cpu_desc of the transmit descriptor cpu_desc on the RAM 3 as shown in FIG. 5 (704).

In addition, for the initialization, the CPU 1 sets, in the "number of unit transmit descriptors setting-use register" TX_DESC_NUM in the register 9a, the number of elements, n, on the RAM 3 (705). In addition, for the initialization, the CPU 1 sets, in the "transmit descriptor storage area starting address setting-use register" TX_DESC_ADR in the register 9a, a starting address @cpu_tx_done of the transmission completion pointer cpu_tx_done on the RAM 3 (706).

Thereafter, the CPU 1 permits a transmission completion interrupt using the "transmission completion interrupt setting-use register" TX_INT in the register 9a (707). The initialization of the network card 9 is performed in the above-described manner.

Figure 8:
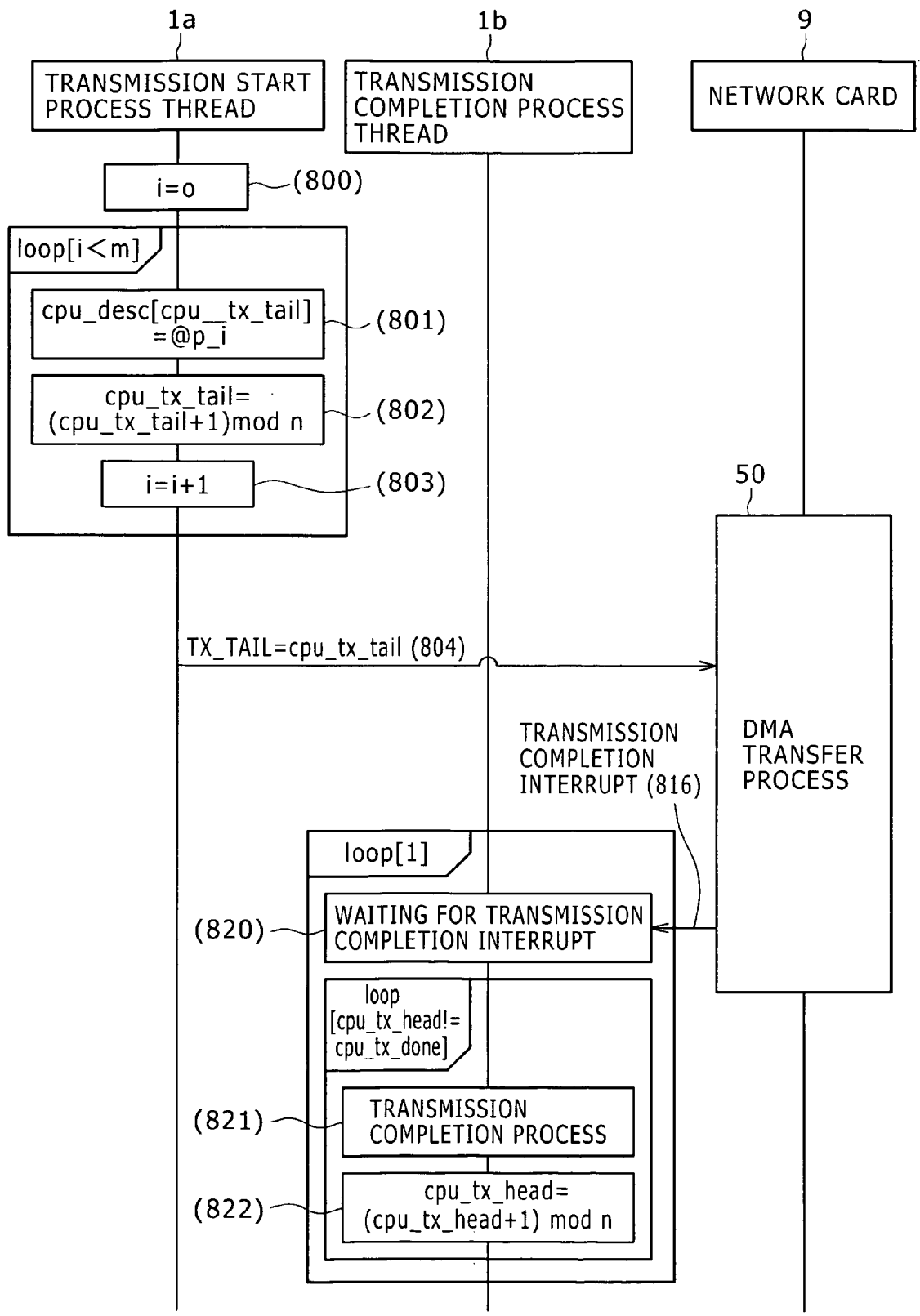
FIGS. 8 and 9 are sequence diagrams illustrating an exemplary DMA transfer of transmission packets.
Figure 9:
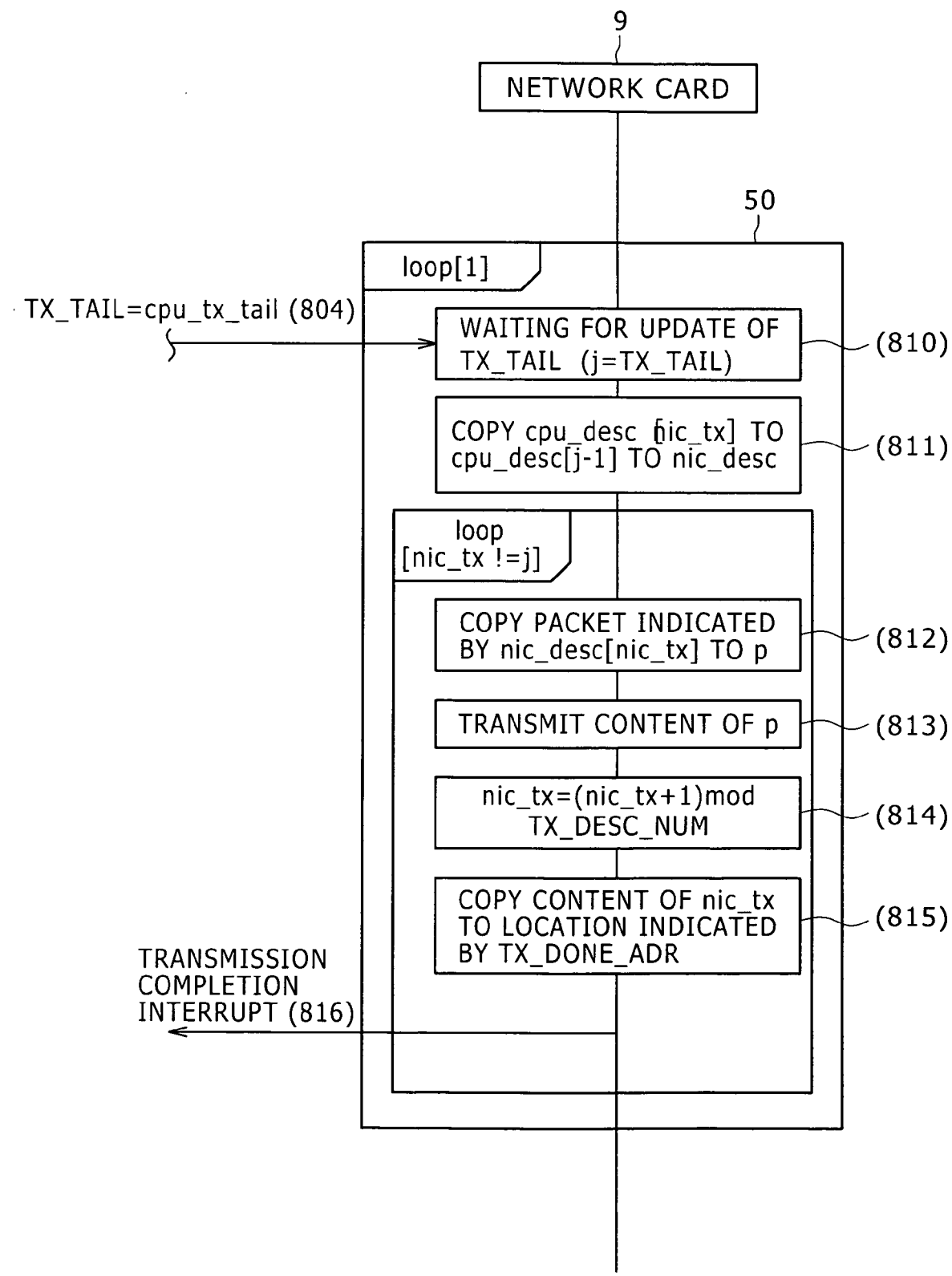

FIGS. 8 and 9 are sequence diagrams illustrating an example of the DMA transfer of the transmission packets. For want of space, processes within a DMA transfer process block 50 of the network card 9 as shown in FIG. 8 are illustrated in FIG. 9. As shown in FIG. 8, a transmission start process thread 1a on the part of the CPU 1 first sets a counter value i to "0" for the initialization (800). Next, the transmission start process thread 1a sets an address @p_i and a size of transmission packet p_i in the transmit descriptor cpu_desc on the RAM 3 (see FIG. 5) (801). Next, the transmission start process thread 1a updates the transmission tail pointer cpu_tx_tail (802). When updated, cpu_tx_tail is generally incremented by one, while taking modulo n (i.e., the number of descriptors) in order to use the transmit descriptor 21 in a ring manner. The above-described operations of (801) and (802) are repeated a required number of times (e.g., the number of transmission packets, m). Finally, the transmission start process thread 1a writes the value of the transmission tail pointer cpu_tx_tail to the "transmission tail pointer setting-use register" TX_TAIL, and instructs the DMA transfer section 9b of the network card 9 to start the transfer (804).

Referring to FIG. 9, when the "transmission tail pointer setting-use register" TX_TAIL in the register 9a has been updated, the network card 9 saves TX_TAIL to a variable j (810). Thereafter, the DMA transfer section 9b of the network card 9 copies, as the transmit descriptor nic_desc, a part of the transmit descriptor cpu_desc which ranges from the descriptor number nic_tx (initialized to "0") in the temporary storage section 9c to a "variable j−1" to the temporary storage section 9c (811).

Next, the DMA transfer section 9b copies transmission packets on the RAM 3 which are associated with the transmit descriptor nic_desc and indicated by the descriptor number nic_tx in the temporary storage section 9c sequentially to the area p in the temporary storage section 9c (812). Next, the packet communication section 9d transmits, to the network 10, the transmission packet copied to the area p in the temporary storage section 9c as shown in FIG. 6 (813).

After transmitting the transmission packet to the network 10, the packet communication section 9d updates the descriptor number nic_tx. For example, the packet communication section 9d sets, in the descriptor number nic_tx, a remainder (modulo) when a value obtained by adding "1" to the descriptor number nic_tx is divided by the number of unit transmit descriptors stored in the register TX_DESC_NUM, thereby updating the descriptor number nic_tx (814). Thereafter, the DMA transfer section 9b accesses the RAM 3 and copies (transfers) a content of the descriptor number nic_tx to the area on the RAM 3 which is indicated by the "transmission completion pointer storage area starting address setting-use register" TX_DONE_ADR (815).

Next, the interrupt generation section 9e generates the transmission completion interrupt, and notifies a transmission completion process thread 1b on the part of the CPU 1 that the transmission of the transmission packet associated with the descriptor number nic_tx of the transmit descriptor nic_desc in the process block (812) has been completed (816). At this time, the transmission completion process thread 1b as shown in FIG. 8 is waiting for input of the transmission completion interrupt (820).

Upon receipt of the transmission completion interrupt from the interrupt generation section 9e, the transmission completion process thread 1b acquires the starting address and size of the transmission packet from the descriptor number nic_tx in the temporary storage section 9c, which has been copied to the RAM 3, to obtain the transmission completion pointer cpu_tx_done. Thereafter, the transmission completion process thread 1b performs the transmission completion process with respect to a range starting with the transmission head pointer cpu_tx_head and ending with the transmission completion pointer cpu_tx_done sequentially (821). Here, the transmission completion pointer cpu_tx_done indicates a location at which the packet communication section 9d of the network card 9 has finished the transmission, which has been copied to the area on the RAM 3 indicated by the "transmission completion pointer storage area starting address setting-use register" TX_DONE_ADR at the above-described process (815).

In the above-described manner, the CPU 1 is capable of recognizing the transmission completion location by accessing the RAM 3, without the need to access the register 9a. This leads to an increase in processing speed. After the completion of the transmission completion process, the CPU 1 releases the packet buffer and notifies the application of the completion of the transmission.

In the above-described example, the CPU 1 is notified of the completion of the transmission by the interrupt. Note, however, that even if the transmission completion interrupt is not generated, the CPU 1 is capable of performing the transmission completion process by observing a change in the value of the transmission completion pointer cpu_tx_done. This makes it possible to omit the interrupt process, which requires a relatively long time and high processing cost, leading to the likelihood that the processing speed will be improved.

In the above-described example, the network card 9 transmits the packets. Note, however, that the above-described technique is also applicable to reception of the packets in a likewise manner. Also note that the above-described technique is applicable not only to the network card 9 but also to other devices that have the DMA capability and transmit and receive continuous data.

Also note that a program for causing a computer to execute the information processing method and the DMA transfer method in accordance with the sequence as shown in FIGS. 8 and 9 may be stored in the ROM 2 or the storage section 8 as shown in FIG. 1, and this program in the ROM 2 or the like may be executed. Alternatively, the program may be stored in a computer-readable storage medium (e.g., a CD-ROM), and the computer-readable storage medium may be played to execute the program.

As described above, according to the PC 100, the information processing method, the program therefor, and the storage medium storing the program according to the first embodiment of the present invention, when the information is DMA transferred between the temporary storage section 9c and the RAM 3, the transmit descriptor nic_desc concerning the DMA transferred transmission packets is DMA transferred from the temporary storage section 9c to the RAM 3, and the CPU 1 loads the transmit descriptor nic_desc from the RAM 3.

Accordingly, the CPU 1 is capable of loading the transmit descriptor nic_desc without the need to access the register 9a, which would require a long processing time. This reduces a load imposed on the CPU 1, thereby increasing the processing speed of the PC 100.

Further, according to the DMA controller, the DMA transfer method, the program therefor, and the storage medium storing the program according to the first embodiment of the present invention, when the transmission packet is DMA transferred between the temporary storage section 9c and the RAM 3, the transmit descriptor nic_desc concerning the DMA transferred transmission packet is DMA transferred from the temporary storage section 9c to the RAM 3.

Accordingly, the transmit descriptor nic_desc concerning the DMA transferred transmission packet can be loaded from the RAM 3 without the need to access the register 9a, which would require a long processing time. This contributes to increasing the processing speed.

Second Embodiment

Figure 10:
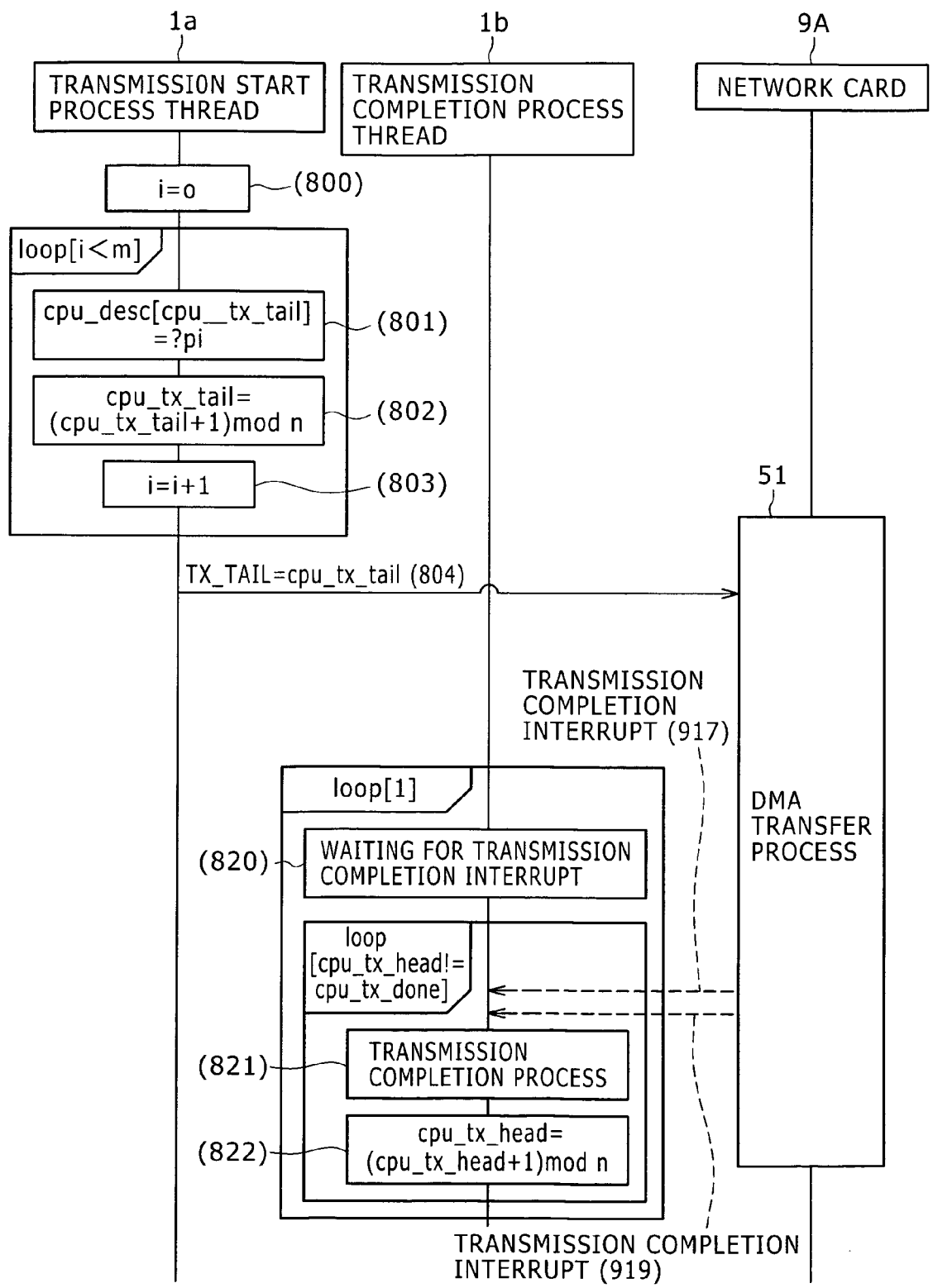
FIGS. 10 and 11 are sequence diagrams illustrating an exemplary DMA transfer of the transmission packets according to a second embodiment of the present invention.
Figure 11:
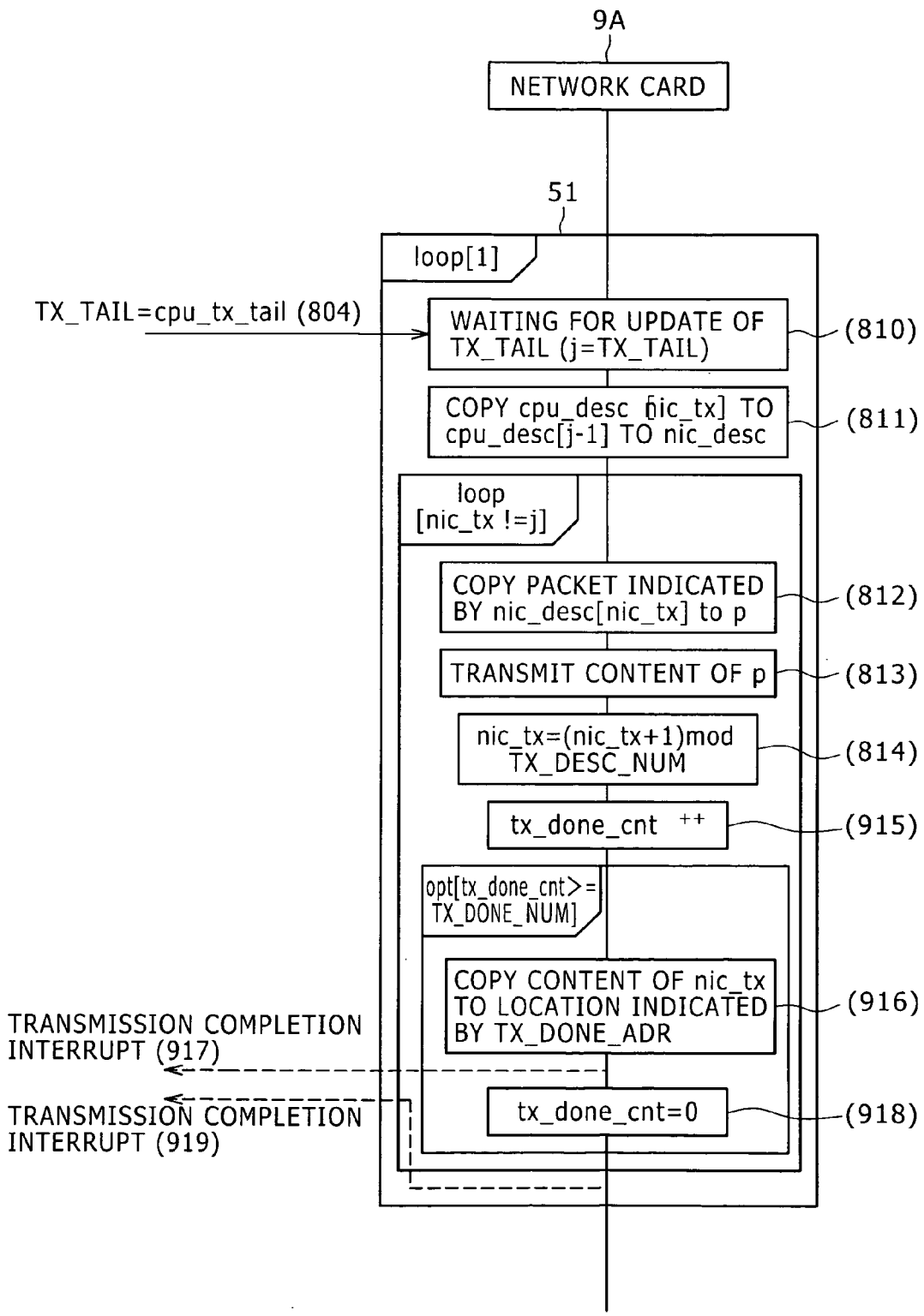

Next, an exemplary DMA transfer of the transmission packets according to a second embodiment of the present invention will now be described below. In this embodiment, a method will be described for reducing a frequency with which the transmission completion pointer is updated based on the number of transmission packets. FIGS. 10 and 11 are sequence diagrams illustrating the exemplary DMA transfer of the transmission packets according to the second embodiment of the present invention. For want of space, processes within a DMA transfer process block 51 of a network card 9A as shown in FIG. 10 are illustrated in FIG. 11.

As a prerequisite, a "transmission completion pointer frequency-based reduction setting-use register" TX_DONE_NUM used to store a frequency reference value, which serves as a reference for the number of DMA transfers of the transmission packets, is additionally prepared in the register 9a of the network card 9A. When the network card 9A is initialized, the CPU 1 sets the value (i.e., the frequency reference value) of the "transmission completion pointer frequency-based reduction setting-use register" TX_DONE_NUM in the register 9a to a predetermined value. This value of the register TX_DONE_NUM may be originally stored in the ROM 2 as shown in FIG. 1, or entered via the input section 6 and stored in the storage section 8, for example. In this case, at the time of the initialization, the CPU 1 loads the predetermined value from the ROM 2 or the storage section 8, and sets the value in the register TX_DONE_NUM.

Further, the DMA transfer section 9b of the network card 9A functions as a counter as well, and a transmission completion notification counter tx_done_cnt is used to count the number of DMA transfers of the transmission packets. When the initialization (resetting) is performed, the DMA transfer section 9b sets the transmission completion notification counter tx_done_cnt to "0". Note that process blocks that have their counterparts in the sequence diagrams as shown in FIGS. 8 and 9 are assigned the same reference numerals as their counterparts, and detailed descriptions thereof will be omitted. Process blocks denoted by reference numerals (915) to (919) as shown in FIG. 11 do not exist in FIGS. 8 and 9 and are specific to the present embodiment.

The above being the prerequisite, the transmission start process thread 1a on the part of the CPU 1 as shown in FIG. 10 performs the initialization process (800) to (803) as shown in FIG. 8, and after the initialization process is completed, the transmission start process thread 1a writes the value of the transmission tail pointer cpu_tx_tail to the "transmission tail pointer setting-use register" TX_TAIL in the register 9a of the network card 9A. Thereafter, the transmission start process thread 1a instructs the DMA transfer section 9b of the network card 9A as shown in FIG. 11 to start the transfer (804).

Next, the DMA transfer section 9b copies, as the transmit descriptor nic_desc, a part of the transmit descriptor cpu_desc which ranges from the descriptor number nic_tx in the temporary storage section 9c to the "variable j–1" to the temporary storage section 9c (810 and 811).

Next, the DMA transfer section 9b copies transmission packets on the RAM 3 which are indicated by the descriptor number nic_tx of the transmit descriptor nic_desc in the temporary storage section 9c sequentially to the area p in the temporary storage section 9c (812). The packet communication section 9d transmits, to the network 10, the transmission packet copied to the area p in the temporary storage section 9c (813). After transmitting the transmission packet to the network 10, the packet communication section 9d updates the descriptor number nic_tx (814), and increments the transmission completion notification counter tx_done_cnt (915).

Thereafter, the DMA transfer section 9b compares the value of the "transmission completion pointer frequency-based reduction setting-use register" TX_DONE_NUM with the counter value of the transmission completion notification counter tx_done_cnt, and based on a result of the comparison, the DMA transfer section 9b determines whether or not the transmit descriptor nic_desc concerning the DMA transferred transmission packet is to be DMA transferred from the temporary storage section 9c to the RAM 3.

If the counter value of the transmission completion notification counter tx_done_cnt is equal to or greater than the value of the "transmission completion pointer frequency-based reduction setting-use register" TX_DONE_NUM, for example, the DMA transfer section 9b accesses the RAM 3 and copies the content of the descriptor number nic_tx to that area on the RAM 3 which is indicated by the "transmission completion pointer storage area starting address setting-use register" TX_DONE_ADR (916). Next, the interrupt generation section 9e generates the transmission completion interrupt and notifies the transmission completion process thread 1b on the part of the CPU 1 that the transmission of the transmission packet indicated by the descriptor number nic_tx of the transmit descriptor nic_desc in the process block (812) has been completed (917). Thereafter, the DMA transfer section 9b sets the transmission completion notification counter tx_done_cnt to "0", thereby initializing it.

Meanwhile, if the counter value of the transmission completion notification counter tx_done_cnt is smaller than the value of the "transmission completion pointer frequency-based reduction setting-use register" TX_DONE_NUM, the DMA transfer section 9b proceeds to the process block (812), and copies transmission packets on the RAM 3 which are indicated by the descriptor number nic_tx of a next transmit descriptor nic_desc sequentially to the area p in the temporary storage section 9c.

As described above, in the DMA transfer method according to the second embodiment of the present invention, the DMA transfer section 9b compares the value of the "transmission completion pointer frequency-based reduction setting-use register" TX_DONE_NUM with the counter value of the transmission completion notification counter tx_done_cnt to determine whether or not the transmit descriptor nic_desc is to be DMA transferred.

Accordingly, as compared with the process block (815) as shown in FIG. 9, the update frequency, with which the DMA transfer section 9b copies the content of the descriptor number nic_tx to that area on the RAM 3 which is indicated by the "transmission completion pointer storage area starting address setting-use register" TX_DONE_ADR (916), can be reduced based on the number of transmission operations. Accordingly, since the DMA is activated at specified intervals, unnecessary update operations can be prevented to increase the processing speed. Note that the notification of the completion of the transmission may be issued not only at the time of the transmission completion interrupt (917) but also when the transfer of transmission packets as initiated by a superior entity has been completed entirely (919).

Third Embodiment

Figure 12:
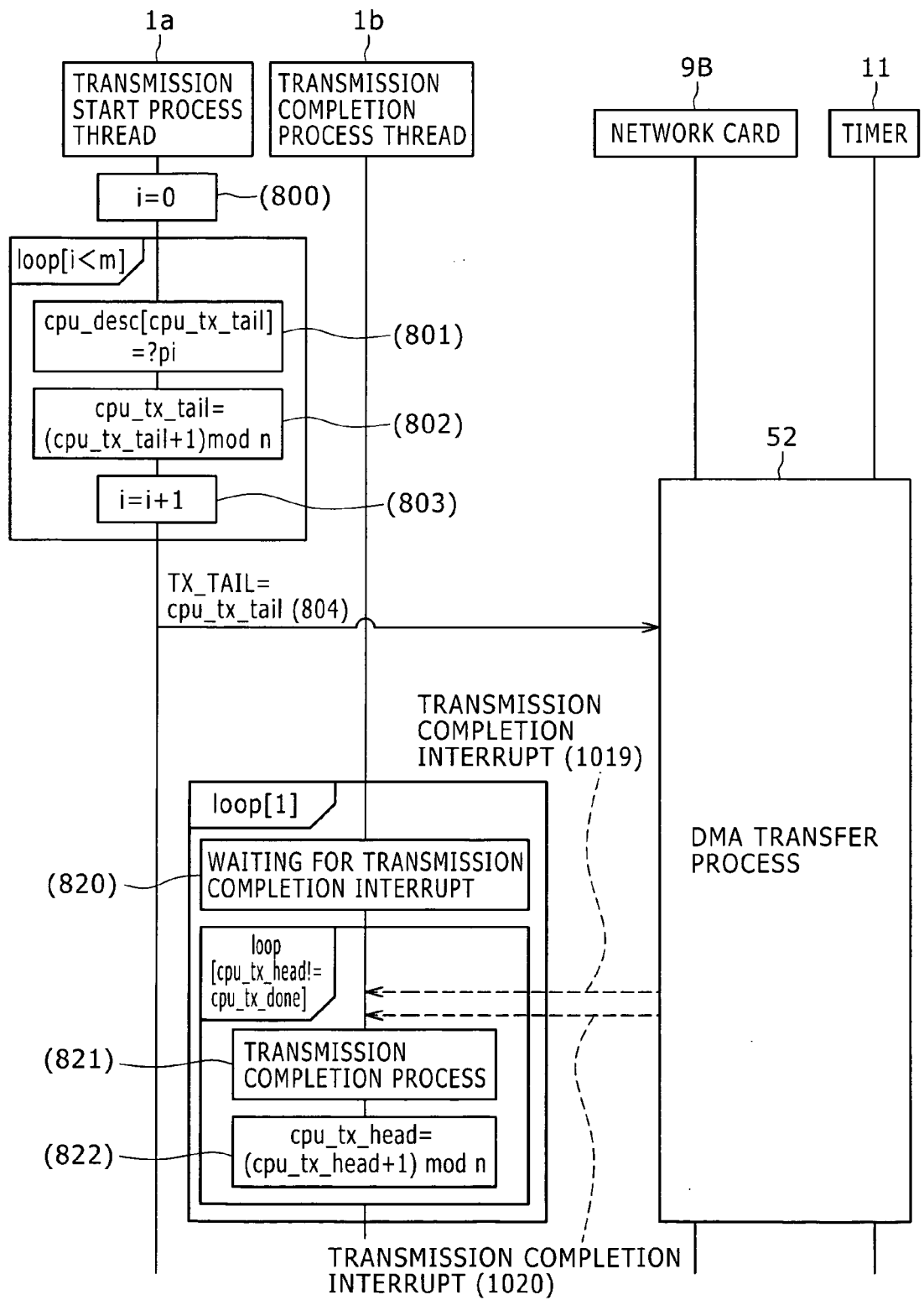
FIGS. 12 and 13 are sequence diagrams illustrating an exemplary DMA transfer of the transmission packets according to a third embodiment of the present invention.
Figure 13:
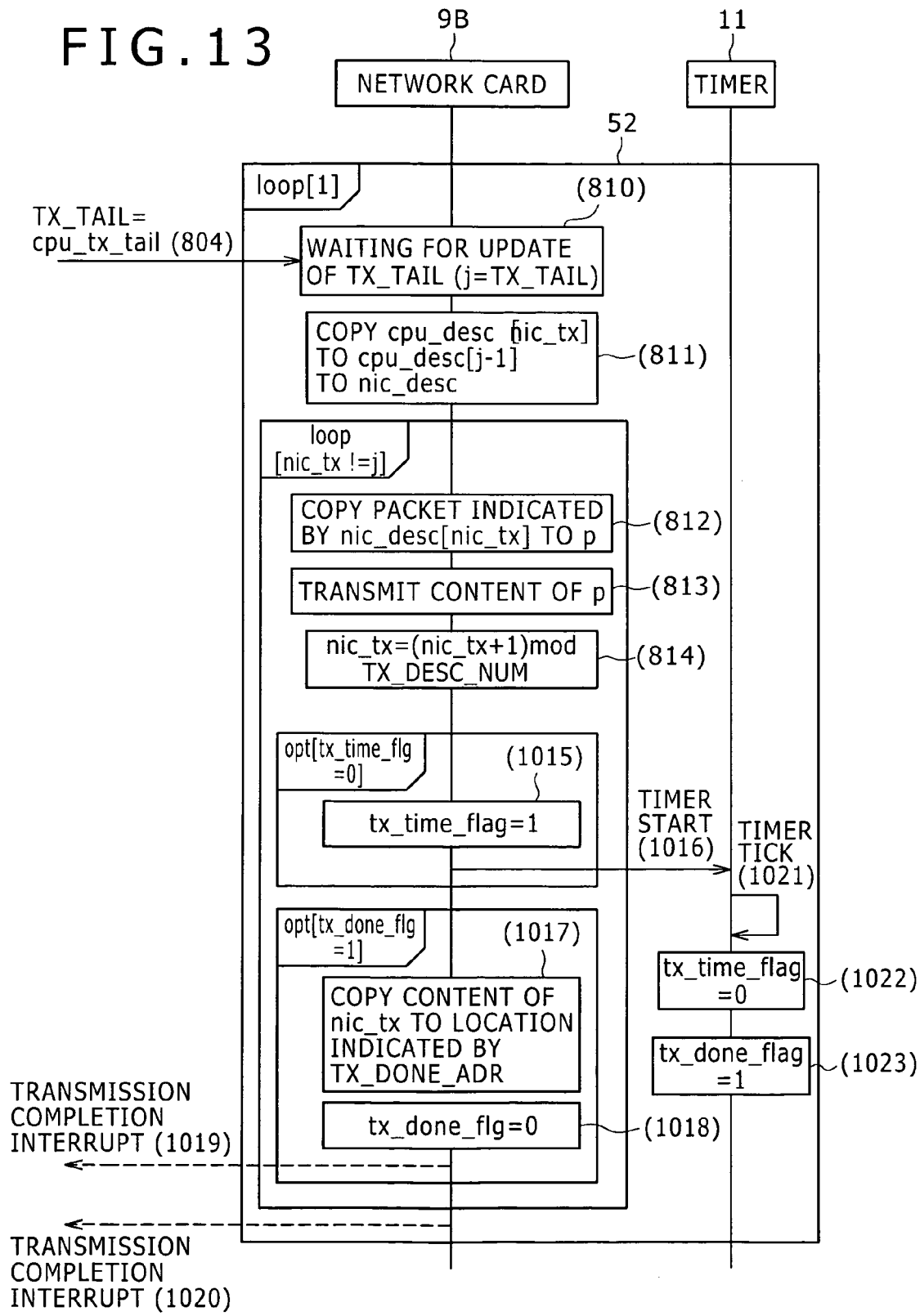

Next, an exemplary DMA transfer of the transmission packets according to a third embodiment of the present invention will now be described below. In this embodiment, a method will be described for reducing the frequency with which the transmission completion pointer is updated based on duration. FIGS. 12 and 13 are sequence diagrams illustrating the exemplary DMA transfer of the transmission packets according to the third embodiment of the present invention.

For want of space, processes within a DMA transfer process block 52 of a network card 9B as shown in FIG. 12 are illustrated in FIG. 13.

As a prerequisite, the DMA transfer section 9b of the network card 9B includes a timer 11 for counting the duration of the DMA transfer of the transmission packets. A "transmission completion pointer duration-based reduction setting-use register" TX_DONE_TIME used to store a duration reference value, which serves as a reference for the duration of the DMA transfer of the transmission packets, is additionally prepared in the register 9a of the network card 9B. When the network card 9B is initialized, the CPU 1 sets the value (i.e., the duration reference value) of the "transmission completion pointer duration-based reduction setting-use register" TX_DONE_TIME in the register 9a of the network card 9B to a predetermined value. This value of the register TX_DONE_TIME may be originally stored in the ROM 2 as shown in FIG. 1, or entered via the input section 6 and stored in the storage section 8, for example. In this case, at the time of the initialization, the CPU 1 loads the predetermined value from the ROM 2 or the storage section 8, and sets the value in the register TX_DONE_TIME.

When the initialization (resetting) is performed, the network card 9B sets a transmission completion notification flag tx_done_flg to "0", and also sets a timer set flag tx_time_flg to "0". Note that process blocks that have their counterparts in the sequence diagrams as shown in FIGS. 8 and 9 are assigned the same reference numerals as their counterparts, and detailed descriptions thereof will be omitted. Processes denoted by reference numerals (1015) to (1023) as shown in FIG. 13 do not exist in FIGS. 8 and 9 and are specific to the present embodiment.

The above being the prerequisite, the transmission start process thread 1a on the part of the CPU 1 as shown in FIG. 12 performs the initialization process (800) to (803) as shown in FIG. 8, and after the initialization process is completed, the transmission start process thread 1a writes the value of the transmission tail pointer cpu_tx_tail to the "transmission tail pointer setting-use register" TX_TAIL in the register 9a of the network card 9B, and instructs the DMA transfer section 9b of the network card 9B as shown in FIG. 13 to start the transfer (804).

Thereafter, the DMA transfer section 9b copies, as the transmit descriptor nic_desc, a part of the transmit descriptor cpu_desc which ranges from the descriptor number nic_tx in the temporary storage section 9c to the "variable j−1" to the temporary storage section 9c (810 and 811).

Next, the DMA transfer section 9b copies transmission packets on the RAM 3 which are indicated by the descriptor number nic_tx of the transmit descriptor nic_desc in the temporary storage section 9c sequentially to the area p in the temporary storage section 9c (812). Next, the packet communication section 9d transmits, to the network 10, the transmission packet copied to the area p in the temporary storage section 9c (813). After transmitting the transmission packet to the network 10, the packet communication section 9d updates the descriptor number nic_tx (814).

After updating the descriptor number nic_tx, the DMA transfer section 9b compares the value (i.e., the duration reference value) of the "transmission completion pointer duration-based reduction setting-use register" TX_DONE_TIME with a count value of the timer 11, and based on a result of the comparison, the DMA transfer section 9b determines whether or not the transmit descriptor nic_desc concerning the DMA transferred transmission packet is to be DMA transferred from the temporary storage section 9c to the RAM 3.

For example, if the timer set flag tx_time_flg indicates "0" (i.e., if the timer has not been started), the DMA transfer section 9b sets the timer set flag tx_time_flg to "1" and starts the timer 11 (1015 and 1016).

When a period of time indicated by the value of the "transmission completion pointer duration-based reduction setting-use register" TX_DONE_TIME has elapsed (tick), the timer 11 sets the timer set flag tx_time_flg to "0" and the transmission completion notification flag tx_done_flg to "1", thereby notifying the DMA transfer section 9b of the network card 9B that the timer 11 has ticked (1021, 1022, and 1023).

When the transmission completion notification flag tx_done_flg indicates "1", the DMA transfer section 9b accesses the RAM 3 and copies the content of the descriptor number nic_tx to that area on the RAM 3 which is indicated by the "transmission completion pointer storage area starting address setting-use register" TX_DONE_DR (1017).

Thereafter, the DMA transfer section 9b sets the transmission completion notification flag tx_done_flg to "0", thereby initializing it. The interrupt generation section 9e generates the transmission completion interrupt and notifies the transmission completion process thread 1b on the part of the CPU 1 that the transmission of the transmission packet indicated by the descriptor number nic_tx in the above-described process block (812) has been completed (1019).

Meanwhile, when the transmission completion notification flag tx_done_flg does not indicate "1", the DMA transfer section 9b proceeds to the process block (812) and copies transmission packets on the RAM 3 which are indicated by the next descriptor number nic_tx sequentially to the area p in the temporary storage section 9c.

As described above, in the DMA transfer method according to the third embodiment of the present invention, the DMA transfer section 9b compares the value (i.e., the duration reference value) of the "transmission completion pointer duration-based reduction setting-use register" TX_DONE_TIME with the count value of the timer 11 to determine whether or not the transmit descriptor nic_desc is to be DMA transferred.

Accordingly, as compared with the process block (815) as shown in FIG. 9, the update frequency, with which the DMA transfer section 9b copies the content of the descriptor number nic_tx to that area on the RAM 3 which is indicated by the "transmission completion pointer storage area starting address setting-use register" TX_DONE_ADR (1017), can be reduced based on the duration. Accordingly, since the DMA is activated at specified intervals, unnecessary update operations can be prevented to increase the processing speed. Note that the notification of the completion of the transmission may be issued not only at the time of the transmission completion interrupt (1019) but also when the transfer of transmission packets as initiated by the superior entity has been completed entirely (1020).

The present invention can be suitably applied to an information processing apparatus that DMA transfers information between the storage section in the information transfer system, such as the network card, and the storage section in the information processing system having the CPU, for example.

It should be understood by those skilled in the art that various modifications, combinations, sub-combinations and alterations may occur depending on design requirements and other factors insofar as they are within the scope of the appended claims or the equivalents thereof.

What is claimed is:

1. An information processing apparatus that transfers information, using direct memory access (DMA), between a first storage section in an information processing system and a second storage section in an information transfer system,
the information processing system including
the first storage section configured to store the information, and
a control section Configured to control the apparatus,
the information transfer system including
the second storage section configured to store descriptor information that indicates a location at which the information is stored in the first storage section and a size of the information, and
a DMA transfer section configured to DMA transfer the information between the first storage section and the second storage section based on the descriptor information stored in the second storage section, wherein
the DMA transfer section DMA transfers the descriptor information concerning the DMA transferred information from the second storage section to the first storage section, and
the control section loads, from the first storage section, the descriptor information which has been DMA transferred by the DMA transfer section,
wherein
when the DMA transfer of the information has been completed, the DMA transfer section DMA transfers descriptor information indicating completion of the DMA transfer of the information from the second storage section in the information transfer system to the first storage section in the information processing system, and
the control section loads the descriptor information indicating the completion of the DMA transfer from the first storage section, wherein an I/O interface of the information processing system is connected to a network via a transmission section having a register, DMA transfer section, temporary storage and an interrupt generation section.

2. The information processing apparatus according to claim 1, wherein
the DMA transfer section includes a counter configured to count the number of DMA transfers performed for the information,
the DMA transfer section compares a frequency reference value that serves as a reference for the number of DMA transfers performed for the information with the number of DMA transfers counted by the counter, and
based on a result of the comparison, the DMA transfer section determines whether or not the descriptor information concerning the DMA transferred information is to be DMA transferred from the second storage section in the information transfer system to the first storage section in the information processing system.

3. The information processing apparatus according to claim 1, wherein
the DMA transfer section includes a timer configured to measure duration of the DMA transfer of the information,
the DMA transfer section compares a duration reference value that serves as a reference for the duration of the DMA transfer of the information with the duration measured by the timer, and
based on a result of the comparison, the DMA transfer section determines whether or not the descriptor information concerning the DMA transferred information is to be DMA transferred from the second storage section in the information transfer system to the first storage section in the information processing system.

4. The information processing apparatus according to claim 1, wherein DMA is selectively activated at specified intervals to thereby increase processing speeds.

5. An information processing method of direct memory access (DMA) transferring information between a first storage section in an information processing system and a second storage section in an information transfer system, the method comprising the steps of:
generating descriptor information that indicates a location at which the information is stored in the first storage section and a size of the information;
storing the generated descriptor information in the second storage section in the information transfer system;
DMA transferring the information between the first storage section and the second storage section based on the descriptor information stored in the second storage section;
DMA transferring the descriptor information concerning the DMA transferred information from the second storage section to the first storage section; and
loading the DMA transferred descriptor information from the first storage section, wherein
when the DMA transfer of the information has been completed, the DMA transfer section DMA transfers descriptor information indicating completion of the DMA transfer of the information from the second storage section in the information transfer system to the first storage section in the information processing system, and
the control section loads the descriptor information indicating the completion of the DMA transfer from the first storage section, and further wherein an I/O interface of the information processing system is connected to a network via a transmission section having a register, DMA transfer section, temporary storage and an interrupt generation section.

6. The information processing method according to claim 5, wherein DMA is selectively activated at specified intervals to thereby increase processing speeds.

7. A program for causing a computer to execute an information processing method to direct memory access (DMA) transfer information between a first storage section in an information processing system and a second storage section in an information transfer system, the method including the steps of:
generating descriptor information that indicates a location at which the information is stored in the first storage section and a size of the information;
storing the generated descriptor information in the second storage section in the information transfer system;
DMA transferring the information between the first storage section and the second storage section based on the descriptor information stored in the second storage section;
DMA transferring the descriptor information concerning the DMA transferred information from the second storage section to the first storage section; and
loading the DMA transferred descriptor information from the first storage section, wherein
when the DMA transfer of the information has been completed, the DMA transfer section DMA transfers descriptor information indicating completion of the DMA transfer of the information from the second storage section in the information transfer system to the first storage section in the information processing system, and the control section loads the descriptor information indicating the completion of the DMA transfer from the first storage section, and further wherein an I/O interface of the information processing system is connected to a network via a transmission section having a register, DMA transfer section, temporary storage and an interrupt generation section.

8. A computer-readable storage medium that has stored therein a program for causing a computer to execute an information processing method to direct memory access (DMA) transfer information between a first storage section in an information processing system and a second storage section in an information transfer system, the method including the steps of:

generating descriptor information that indicates a location at which the information is stored in the first storage section and a size of the information;

storing the generated descriptor information in the second storage section in the information transfer system;

DMA transferring the information between the first storage section and the second storage section based on the descriptor information stored in the second storage section;

DMA transferring the descriptor information concerning the DMA transferred information from the second storage section to the first storage section; and loading the DMA transferred descriptor information from the first storage section, wherein when the DMA transfer of the information has been completed, the DMA transfer section DMA transfers descriptor information indicating completion of the DMA transfer of the information from the second storage section in the information transfer system to the first storage section in the information processing system, and the control section loads the descriptor information indicating the completion of the DMA transfer from the first storage section, and further wherein an I/O interface of the information processing system is connected to a network via a transmission section having a register, DMA transfer section, temporary storage and an interrupt generation section.

9. A direct memory access (DMA) controller for DMA transferring information between a first storage section in an information processing system and a second storage section in an information transfer system, the DMA controller comprising:

said second storage section configured to store descriptor information that indicates a location at which the information is stored in the first storage section and a size of the information; and a DMA transfer section configured to DMA transfer the information between the first storage section and said second storage section based on the descriptor information stored in said second storage section, wherein said DMA transfer section DMA transfers the descriptor information concerning the DMA transferred information from said second storage section to the first storage section, wherein when the DMA transfer of the information has been completed, the DMA transfer section DMA transfers descriptor information indicating completion of the DMA transfer of the information from the second storage section in the information transfer system to the first storage section in the information processing system, and the control section loads the descriptor information indicating the completion of the DMA transfer from the first storage section, and further wherein an I/O interface of the information processing system is connected to a network via a transmission section having a register, DMA transfer section, temporary storage and an interrupt generation section.

10. The DMA controller according to claim 9, wherein said DMA transfer section includes a counter configured to count the number of DMA transfers performed for the information, said DMA transfer section compares a frequency reference value that serves as a reference for the number of DMA transfers performed for the information with the number of DMA transfers counted by the counter, and based on a result of the comparison, said DMA, transfer section determines whether or not the descriptor information concerning the DMA transferred information is to be DMA transferred from said second storage section in the information transfer system to the first storage section in the information processing system.

11. The DMA controller according to claim 9, wherein said DMA transfer section includes a timer configured to measure duration of the DMA transfer of the information, said DMA transfer section compares a duration reference value that serves as a reference for the duration of the DMA transfer of the information with the duration measured by the timer, and based on a result of the comparison, said DMA transfer section determines whether or not the descriptor information concerning the DMA transferred information is to be DMA transferred from said second storage section in the information transfer system to the first storage section in the information processing system.

12. A direct memory access (DMA) transfer method of DMA transferring information between a first storage section in an information processing system and a second storage section in an information transfer system, the method comprising the steps of:

generating descriptor information that indicates a location at which the information is stored in the first storage section and a size of the information;

storing the generated descriptor information in the second storage section in the information transfer system;

DMA transferring the information between the first storage section and the second storage section based on the descriptor information stored in the second storage section; and DMA transferring the descriptor information concerning the DMA transferred information from the second storage section to the first storage section, wherein when the DMA transfer of the information has been completed, the DMA transfer section DMA transfers descriptor information indicating completion of the DMA transfer of the information from the second storage section in the information transfer system to the first storage section in the information processing system, and the control section loads the descriptor information indicating the completion of the DMA transfer from the first storage section, wherein an I/O interface of the information processing system is connected to a network via a transmission section having a register, DMA transfer section, temporary storage and an interrupt generation section.

13. A program for causing a computer to execute a direct memory access (DMA) transfer method to DMA transfer information between a first storage section in an information processing system and a second storage section in an information transfer system, the method including the steps of:
   generating descriptor information that indicates a location at which the information is stored in the first storage section and a size of the information;
   storing the generated descriptor information in the second storage section in the information transfer system;
   DMA transferring the information between the first storage section and the second storage section based on the descriptor information stored in the second storage section; and
   DMA transferring the descriptor information concerning the DMA transferred information from the second storage section to the first storage section, wherein
   when the DMA transfer of the information has been completed, the DMA transfer section DMA transfers descriptor information indicating completion of the DMA transfer of the information from the second storage section in the information transfer system to the first storage section in the information processing system, and
   the control section loads the descriptor information indicating the completion of the DMA transfer from the first storage section, wherein an I/O interface of the information processing system is connected to a network via a transmission section having a register, DMA transfer section, temporary storage and an interrupt generation section.

14. A computer-readable storage medium that has stored therein a program for causing a computer to execute a direct memory access (DMA) transfer method to DMA transfer information between a first storage section in an information processing system and a second storage section in an information transfer system, the method including the steps of:
   generating descriptor information that indicates a location at which the information is stored in the first storage section and a size of the information;
   storing the generated descriptor information in the second storage section in the information transfer system;
   DMA transferring the information between the first storage section and the second storage section based on the descriptor information stored in the second storage section; and
   DMA transferring the descriptor information concerning the DMA transferred information from the second storage section to the first storage section, wherein
   when the DMA transfer of the information has been completed, the DMA transfer section DMA transfers descriptor information indicating completion of the DMA transfer of the information from the second storage section in the information transfer system to the first storage section in the information processing system, and
   the control section loads the descriptor information indicating the completion of the DMA transfer from the first storage section, wherein an I/O interface of the information processing system is connected to a network via a transmission section having a register, DMA transfer section, temporary storage and an interrupt generation section.

15. A DMA controller for DMA transferring information between first storage means in an information processing system and second storage means in an information transfer system, the DMA controller comprising:
   said second storage means for storing descriptor information that indicates a location at which the information is stored in the first storage means and a size of the information; and
   DMA transfer means for DMA transferring the information between the first storage means and said second storage means based on the descriptor information stored in said second storage section, wherein
   said DMA transfer means DMA transfers the descriptor information concerning the DMA transferred information from said second storage means to the first storage means, wherein
   when the DMA transfer of the information has been completed, the DMA transfer section DMA transfers descriptor information indicating completion of the DMA transfer of the information from the second storage section in the information transfer system to the first storage section in the information processing system, and
   the control section loads the descriptor information indicating the completion of the DMA transfer from the first storage section, wherein an I/O interface of the information processing system is connected to a network via a transmission section having a register, DMA transfer section, temporary storage and an interrupt generation section.

\* \* \* \* \*